ELECTRONIC COMPUTING APPARATUS

Filed Feb. 5, 1957

INVENTOR
LORIN KNIGHT
BY Hane and Nydick
ATTORNEYS 2,873,366

ELECTRONIC COMPUTING APPARATUS

Lorin Knight, Watertown, Mass., assignor to The British Tabulating Machine Company Limited, London, England Application February 5, 1957, Serial No. 638,273

Claims priority, application Great Britain February 23, 1956

12 Claims. (Cl. 250—27)

This invention relates to electronic calculating or computing apparatus which is operated under control of a master pulse source of substantially constant frequency.

Computing machines which employ a magnetic drum for data storage often have a so-called clock track on the drum, in order to generate a train of clock pulses which control the operation of the machine.

Alternatively, a mast oscillator may be used to generate the pulse train. If the data storage is dynamic, such as an ultra-sonic delay line, the frequency of the oscillator may be automatically controlled within narrow limits, to compensate for the effect of temperature changes on the storage device. In the case of a magnetic drum, the rotational speed of the drum may be controlled in accordance with the frequency of the master oscillator.

In any case, the clock pulse train is of a substantially fixed frequency, say 50 kc./s., and the individual electronic circuits forming the machine are designed for satisfactory operation under control of these pulses. Many of the circuits, such as triggers and gates will operate at lower frequencies than the design frequency provided that the pulse shape remains the same.

When the clock pulse train is derived from a master oscillator, the frequency of the pulse train may be reduced by, say, a factor of ten, either by switching the frequency controlling elements, or by switching to a second master oscillator which operates at the lower frequency. Whichever solution is adopted, it is difficult to maintain the same pulse shape in the two trains; even if the pulse duration is maintained constant, the leading and trailing edges of the pulses tend to be different. The difficulty increases as the difference between the required frequencies increases.

The problem is even more complex when the clock pulses are derived from a magnetic drum since the reading and writing of data on the drum will be seriously affected by any large reduction in speed.

The operation of a computer at reduced speed is advantageous when testing or servicing the machine, and also when it is desired to enter or amend data when the machine is carrying out a calculation programme.

Preferably, it should be possible to operate the machine on a pulse by pulse basis, with the occurrence of each pulse being controlled either by a manual switching operation or by a train of pulses having a suitably slow repetition rate.

It is an object of the present invention to provide control means for an electronic calculating device which operates at a normal speed under control of a master pulse source of substantially fixed frequency, to allow the master pulse source to control operation of the device at a reduced speed.

It is a further object of the invention to provide control means for an electronic calculating device which has cyclically operating storage means and which operates at normal speed under control of a master pulse source of substantially fixed frequency, to allow the master pulse source to control the selection of successive storage locations at a reduced speed.

The invention will now be described, by way of example, with reference to the accompanying drawing, in which.

Figure 1:
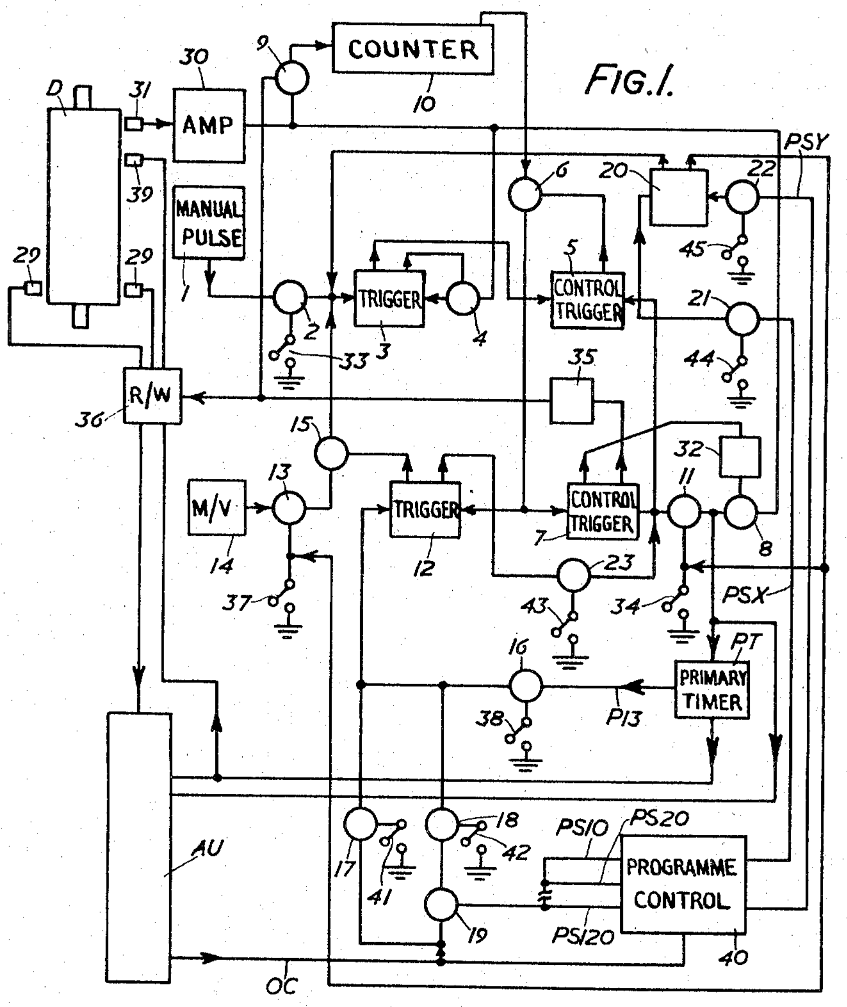
Figure 1 is a block schematic diagram of a control circuit for operating an electronic calculator at reduced speed.

The particular form of control unit to be described is suitable for use with an electronic calculator similar to that described in two articles "An outline of an electronic arithmetic unit" and "A commercial electronic calculator" published in Electronic Engineering, volume 27 (1955), on pp. 212–217 and pp. 332–337 respectively. The calculator described therein is provided with a magnetic drum store D (Figure 1) having a clock track which provides the master pulse source for the control of the machine. The clock track is read by a head 31 wich feeds an amplifier 30. The output from this amplifier consists of a train of uniform clock pulses, the frequency of which is determined by the speed of the drum D. This speed remains substantially constant. There are 273 clock pulses for each revolution of the drum, made up of 21 groups of 13 pulses each. The drum stores 21 words on each track, each word being 10 digits in length, but as one pulse at the end of each word time and two at the beginning are required for control and switching purposes, a word time is 13 clock pulses.

Clock pulses from the amplifier 30 can be applied via a gate 8 to a primary timer PT. This timer produces the operating pulses for timing the various operations which take place in the machine. When the machine is operating at normal speed the gate 8 is open permitting the primary timer to be operated by a constant stream of clock pulses. The control circuit of the invention regulates the supply of clock pulses to the primary timer so that the speed of operation of the machine is slowed down without altering the frequency of occurrence of the clock pulses themselves.

Gate 8 is controlled by a first control trigger 7 which has two stable states referred to as unset and set. A gate controlled directly by the unset output of a trigger will be open when the trigger is unset, and similarly a gate controlled directly by the set output will be open when the trigger is set. The gate 8, is however, controlled from the unset output of the trigger 7 through an inverter 32 so that the gate is open when the trigger is set.

In order to control the machine for predetermined periods of normal or slow speed operation, gates are provided which can be selectively controlled in accordance with the particular type of operation required.

For pulse by pulse operation the trigger 7 is controlled by the timing of a manually operated pulse source 1. To effect this, two switches 33 and 34 are closed. Closing the switch 34 opens a gate 11 between the output of the gate 8 and the unsetting input of the trigger 7. The next occurring clock pulse from the gate 8 unsets the trigger. This closes the gate 8 and thus cuts off the train of clock pulses to the primary timer.

The switch 33 controls a gate 2 operated from the pulse source 1. The output from the gate 2 is used to set a trigger 3, the set output of which controls a gate 4. This gate permits the next occurring clock pulse to be fed to the unsetting input of the trigger 3 so that this trigger is immediately unset again. In unsetting, the trigger applies a setting pulse to a second control trigger 5, the set output of which opens a gate 6. By this arrangement the opening of gate 6 is dependent on a manually initiated pulse from the source 1 but is actually timed by a clock pulse from the amplifier 30.

The set output of trigger 7 controls a gate 9 through an inverter 35, so that the gate is open when the trigger 7 is unset. The gate 9 permits clock pulses to be fed to the input of a counter 10. This counter has a capacity of 273 and the next output from it passes through the gate 6 and sets the trigger 7. This results in closure of the gate 9 and opening of the gate 8, the latter permitting the next clock pulse to be fed to the primary timer and also to the gate 11. The output from gate 11 unsets the trigger 7 and so closes gate 8 and opens gate 9 in preparation for a further cycle of operation. The output from the gate 11 also unsets trigger 5 which, by closing gate 6, prevents the trigger 7 from being set by the next output from the counter.

When the next manual pulse occurs, the above cycle of operations will be repeated so that one clock pulse only is admitted to the primary timer for each pulse from the source 1.

It will be seen from the description on page 336 of the above mentioned reference that the part of the drum store devoted to input and output operates as a recirculating store. To ensure that data on this part of the drum, co-operating with heads 29, is kept recirculating when the control trigger 7 is unset, the output from the inverter 35 is also used to control the reading/writing arrangements 36 of the drum D, so that any other control potential applied to 36 can be overridden when the trigger 7 is unset. When the trigger is set, the normal operating control arrangements of the computer are such that recirculation of data takes place, under the normal arrangements however, recirculation ceases when the trigger 7 is unset, hence the need for the control potential from the unset output of the trigger.

When it is desired to operate the machine at slow speed for a predetermined time, say for one primary timer cycle (13 input pulses to the timer), the switches 33, 34 and a switch 37 are closed. The switch 37 opens gate 13 permitting pulses from a multivibrator 14 to pass to another gate 15 which is at this time held open by the unset output of a trigger 12. The output of the gate 15 is applied to the setting input of trigger 3 in the same manner as pulses from the manual pulse source 1 in the preceding case.

The first pulse from gate 15 initiates the sequence already described and one clock pulse is passed to the primary timer. When the trigger 5 unsets the sequence is again initiated by the next pulse from the gate 15. The primary timer will thus continue to receive input pulses at a slow speed.

The multivibrator 14 can operate at any convenient frequency which may be determined by a manually operated switch which selects any one of several circuits of different time constant. If at least one pulse occurs during every drum revolution, the primary timer will receive one pulse per drum revolution. Slower speeds than this can be obtained if the output pulses from the multivibrator occur less frequently than once per drum revolution.

To terminate the operation when one cycle of the primary timer has been completed a gate 16 is held open by the closure of a switch 38. Gate 16 admits the thirteenth pulse from the primary timer, occurring on a line P13, to the setting input of the trigger 12. The gate 15 is therefore closed so that the supply of pulses from the multivibrator 14 to trigger 3 is cut off and no further pulses from the counter 10 are admitted through gate 6 to the trigger 7.

To resume normal speed operation it is necessary that trigger 7 should be set to admit clock pulses through gate 8 to the primary timer. This is effected by closing gates 11 and 13, and applying a single manual pulse to trigger 3. The next output pulse from the counter will pass through gate 6 to set trigger 7 and unset trigger 12, the output from gate 6 being also taken to the unsetting input of trigger 12.

It will be appreciated that the trigger 7 will be unset by the next clock pulse occurring after the switch 34 is closed, so that the primary timer may be part of the way through the cycle at this time. The slow speed operation will be terminated at the end of the primary timer cycle. If the gates 11 and 13 are left open and a manual pulse is fed to the trigger 3 then the trigger 7 will be set as described above and a complete primary timer cycle at slow speed will take place. Another manual pulse will produce a further cycle of the primary timer and so on. Thus the initiation of each cycle, except the first is controlled by the manual pulse source 1, and the speed of operation during the cycle is controlled by the multivibrator 14. As will be explained, slow speed operation for one or more programme steps may also be obtained and repetition of this longer cycle is also initiated by the pulse source 1.

In operating the circuit under control of pulses from the multivibrator 14, an output from the counter 10 occurs at the 273rd pulse entered into it via the gate 9. This gate is, however, closed for one clock pulse time by the trigger 7, so that the cycle of operation at the fastest slow speed (one pulse entry to the primary timer per drum revolution) is equal to 274 clock pulses, i. e. one revolution of the drum plus one clock pulse. Thus at successive pulse entries to the primary timer, successive storage locations will be positioned at a reading head 39. This permits successive digits of a word to be read out from a track on the drum to an arithmetic unit AU at slow speed under control of the primary timer.

If the speed of operation is less than one pulse per drum revolution, gate 9 remains open during the intervening revolutions, so that successive pulses to the primary timer will occur at intervals of $273n+1$ clock pulses where $n$ is an integer depending on the frequency of the multivibrator 14. The drum will still, therefore, advance effectively one storage location for every pulse entered into the primary timer.

In the above description it has been stated that the capacity of the counter 10 is equal to the number of storage locations on a track of the drum. It can however, be equal to any submultiple of this number. For example, a counter having a capacity of 91 would enable digits to be read successively from three equally spaced positions round the drum. Similarly a counter with a capacity of 13 would permit the reading out of the first digit of the first word, the second digit of the second word and so on.

The sequential selection of functions to be performed by the calculator is effected by a programme controller 40 which is more fully described on page 336 of the cited publication, with special reference to Figure 7 therein.

The controller consists of a shifting register with each trigger controlling, when set, a particular programme step. At the commencement of a calculation the first trigger is set to initiate the first programme step. When this step has been completed, the control section of the arithmetic unit emits an "operation complete" pulse on a line OC. This pulse unsets the first trigger of the programme controller and sets the second trigger. The second programme step is then performed and so on.

As a calculation may take up to 120 programme steps it is of advantage to be able to operate the machine at slow speed for a predetermined number of programme steps.

To operate the machine at slow speed for one programme step, the gates 13, 11 and 2 are opened to permit the circuit to operate under control of the multivibrator as already described. At the end of the next programme step an "operation complete" pulse is fed to a gate 17 controlled by a switch 41. The output of the gate is fed to the setting input of the trigger 12 to set the trigger and so close the gate 15, thereby terminating the operation of the circuit. Once again an additional manual pulse is used to restore triggers 12 and 7 to their normal state.

To operate the machine at slow speed for ten programme steps at a time a gate 18 controlled by a switch 42 is provided. This gate is opened instead of gate 17 to allow "operating complete" pulses to be fed to the trigger 12 under control of a gate 19 which is made dependent on the primary timer by virtue of lines PS10, PS20 . . . PS120. These lines receive gate-opening potentials at the tenth, twentieth . . . and one hundred and twentieth programme steps respectively. Triggers 12 and 7 are restored to their normal setting by a manual pulse.

The termination of a specific period of operation by gate 16, 17 or 18 can be used whether the machine is required to operate for such period at either slow or normal speed. In the latter case a gate 23 controlled by a switch 43 is opened in addition to one of the gates 16, 17 or 18, according to the operation required. The other gates controlling slow operation are closed. Triggers 7 and 12 are normally set and unset respectively when the machine is running at normal speed. At the end of the selected period a pulse is applied to set trigger 12, which in unsetting, applies a pulse through the gate 23 to unset trigger 7. This closes gate 8 to cut off the supply of clock pulses to the primary timer. A pulse from the manual pulse source 1, with gate 2 open, serves to restore triggers 7 and 12 to their normal states when it is desired to resume operating the machine.

When it is desired to interrupt normal running for a predetermined number of programme steps to allow slow speed entry of data into the machine, gates 21 and 22 are opened by means of switches 44 and 45 respectively. Gate 21 admits a setting pulse over a line PSX to set a trigger 20 at the commencement of programme step X and gate 22 admits a pulse on a line PSY to unset the trigger 20 at the commencement of programme step Y, where $Y-X$ is the predetermined number of programme steps. The pulses on the lines PSX and PSY are supplied from the appropriate stages of the programme controller 40.

The set output of trigger 20 opens gates 11 and 13. The machine operates at normal speed until programme step X is reached, whereupon trigger 20 is set and gate 11 is opened. The output from gate 11 causes trigger 7 to unset on the next clock pulse to initiate slow speed operation under control of pulses from the multivibrator 14 in the manner previously described.

The slow speed operation continues until programme step Y is reached whereupon trigger 20 is unset and closes gates 11 and 13. In unsetting, trigger 20 also applies a pulse to set trigger 3 so that the next output pulse from the counter 10 sets trigger 7 to permit resumption of normal speed working. Since both initiation and termination of slow speed operation are controlled by the machine, the manual pulse source 1 is not utilised, unlike the other examples of slow speed operation described above.

Suitable gating and triggering circuits for use in this invention are shown on page 216 of the cited publication.

In Figure 8 therein are shown two stages of a shifting register. V2*a* and V2*b* comprise a trigger such as is used in the invention. Setting and unsetting inputs are applied to the grids of the valves and unset and set control outputs are taken from the anodes. Where it is necessary for a trigger to emit a pulse when setting or unsetting, the output is taken from the appropriate anode through a capacitor.

A suitable gating circuit is shown in Figure 9 on page 216 of the reference. The gate consists of a pentode valve with the control grid and suppressor grid used for control purposes. Gates which are controlled by a switch comprise a similar pentode circuit with the switch connected between the suppressor grid and the earth line.

The arithmetic unit AU is described in the reference articles on pages 212 et seq.

Figure 2:
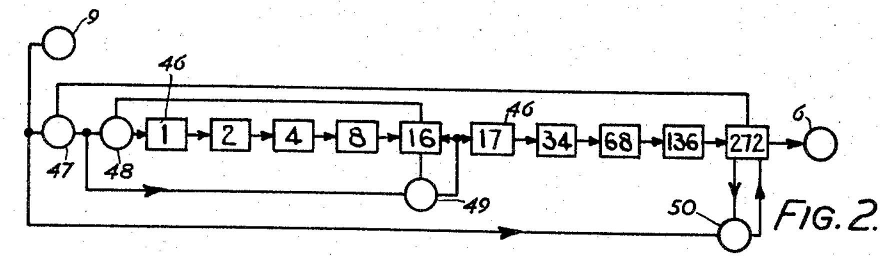
Figure 2 is a block schematic diagram of a counter.

The counter 10 is shown in Figure 2 of the drawings accompanying the specification.

The counter comprises ten trigger stages 46, divided into two groups of five, each group acting as a binary counter. The count indicated by a particular trigger when it is set is indicated within the trigger symbol.

Assuming that all the triggers are unset, the first pulse from the gate 9 passes through two gates in series, 47 and 48 which are open at this time as they are controlled by the unset outputs of the tenth and fifth stage respectively. The output from gate 48 sets the first trigger. The counter operates normally as a binary counter until the sixteenth pulse, which sets the fifth stage. This closes the gate 48 and opens a gate 49 to admit the next pulse to the setting input of the sixth stage and also to the unsetting input of the fifth stage. The sixth stage represents therefore a count of seventeen. Gates 48 and 49 are open and shut respectively for the next sixteen pulses, the 34th pulse being passed to the sixth stage to unset it with a consequent setting of the seventh stage. The 272nd pulse sets the last stage. This closes the gate 47 and opens a gate 50 which admits the 273rd pulse to the unsetting input of the last trigger. In unsetting it emits a pulse to the gate 6. All the triggers are now unset and gates 47 and 48 are open in readiness for another counting cycle.

The primary timer PT comprises a ring of thirteen triggers arranged so that only one trigger is in the set condition at a time. Input pulses transfer the set condition successively round the ring so that each trigger provides a set output in turn.

Although the invention has been described with reference to a calculator having a magnetic drum store, it will be appreciated that it is equally applicable to an electronic calculator having other forms of cyclic storage device, such as recirculating delay lines.

I claim:

1. Electronic calculating apparatus including an arithmetic unit, a timing unit controlling the operation of the arithmetic unit, a first pulse source generating a first train of master clock pulses, a first control means rendering the timing unit operative in response to the master clock pulses, a counter operated by the master clock pulses to produce an output pulse in response to the occurrence of a predetermined number of master clock pulses, a second independently operable pulse source of a frequency lower than the first pulse source, signal gating means controlled by pulses from the first and second sources and by said output pulses and operative to pass a pulse from the first source on coincidence of an output pulse and a pulse from the second source for forming a second pulse train, and second control means operable to render the timing unit responsive to pulses passed by the signal gating means and to render the first control means inoperative.

2. Electronic calculating apparatus as claimed in claim 1, and in which a cyclically operable timing device is caused to be operated by said clock pulses, and in which means are provided for terminating generation of said second pulse train at a pre-determined point in the cycle of the timing device.

3. Electronic calculating apparatus as claimed in claim 1 including a programme step control device which is adapted to be operated by an operation complete pulse on completion of each programme step and means for terminating generation of said second pulse train under control of the operation complete pulses.

4. Electronic calculating apparatus as claimed in claim 3, in which the termination of said second pulse train is controlled jointly by the operation complete pulses and by the programme step control device to terminate the second pulse train on completion of a predetermined programme step.

5. Electronic calculating apparatus as claimed in claim 1 and comprising manual control means for initiating the generation of said second pulse train.

6. Electronic calculating apparatus as claimed in claim 1, in which said gating means includes a first gate circuit controlled by a first bi-stable trigger circuit, the first gate circuit being adapted to pass and block pulses of said first train when the first trigger circuit is in first and second stable states respectively, and a second gate circuit adapted, when operated, to pass pulses passed by the first gate circuit to set said trigger circuit to the second stable state.

7. Electronic calculating apparatus as claimed in claim 6, in which the first trigger circuit is adapted to be set to said first stable state by the output pulses from the counting means which are applied to said trigger circuit through a third gate circuit, and in which the third gate circuit is adapted to be opened to pass said output pulses under control of the second signal source.

8. Electronic calculating apparatus as claimed in claim 7, in which the third gate circuit is controlled by a second bi-stable trigger circuit which is adapted to be set to a first state by a pulse from a manually operated source and by a signal from said second signal source and to be set to a second state by the pulse passed by said first gate circuit, the second trigger circuit being adapted, in the first state, to hold open the third gate circuit.

9. Electronic calculating apparatus as claimed in claim 8, in which the generation of said second pulse train is terminated by preventing setting of the second trigger circuit by the signals from said second signal source.

10. Electronic calculating apparatus as claimed in claim 1, and including a cyclically operable storage device, said counting means being adapted to produce one output pulse for each cycle of the storage device.

11. Electronic calculating apparatus as claimed in claim 10, in which the cyclically operable storage device comprises a magnetic drum and in which said first pulse train is generated under control of said magnetic drum.

12. Electronic calculating apparatus according to claim 1, and comprising a cyclic storage device including a plurality of storage locations accessible in succession, successive pulses of said train of clock pulses occurring in synchronism with the accessibility of successive storage locations and successive pulses of said second train occurring at times when successive storage locations are accessible.

References Cited in the file of this patent

UNITED STATES PATENTS

| | | |
|---|---|---|
| 2,466,044 | Schoenfeld | Apr. 5, 1949 |
| 2,693,531 | Cope | Nov. 2, 1954 |
| 2,705,285 | Holland | Mar. 29, 1955 |